(12) United States Patent
Ma et al.

(10) Patent No.: US 11,528,714 B2
(45) Date of Patent: Dec. 13, 2022

(54) DATA TRANSMISSION METHOD AND APPARATUS

(71) Applicant: Huawei Technologies Co., Ltd., Shenzhen (CN)

(72) Inventors: Ruixiang Ma, Beijing (CN); Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 287 days.

(21) Appl. No.: 16/533,380

(22) Filed: Aug. 6, 2019

(65) Prior Publication Data
US 2019/0364574 A1 Nov. 28, 2019

Related U.S. Application Data

(63) Continuation of application No. PCT/CN2018/075223, filed on Feb. 5, 2018.

(30) Foreign Application Priority Data

Feb. 6, 2017 (CN) .......................... 201710065963.3

(51) Int. Cl.
*H04W 72/08* (2009.01)
*H04W 72/02* (2009.01)
*H04W 72/04* (2009.01)

(52) U.S. Cl.
CPC ......... *H04W 72/085* (2013.01); *H04W 72/02* (2013.01); *H04W 72/0413* (2013.01); *H04W 72/0446* (2013.01)

(58) Field of Classification Search
None
See application file for complete search history.

(56) References Cited

U.S. PATENT DOCUMENTS

| 2008/0209299 A1 | 8/2008 | Chang et al. |
| 2016/0219627 A1* | 7/2016 | Au .................. H04W 72/04 |
| 2020/0037345 A1* | 1/2020 | Ryoo .............. H04W 72/1284 |

FOREIGN PATENT DOCUMENTS

| CN | 101388755 A | 3/2009 |
| CN | 101611585 A | 12/2009 |

(Continued)

OTHER PUBLICATIONS

HARQ timing relationships for grant-free transmission, 3GPP TSG-RAN WG1 Meeting #86, Gothenburg, Sweden, 1-167206, XP051140574, pp. 1-2, 3rd Generation Partnership Project, Valbonne, France (Aug. 22-26, 2016) (Year: 2016).*

(Continued)

*Primary Examiner* — Shripal K Khajuria
(74) *Attorney, Agent, or Firm* — Leydig, Voit & Mayer, Ltd.

(57) ABSTRACT

This application provides a data transmission method and apparatus. A terminal device sends first data to a network device in the $n^{th}$ time unit, where n is an integer greater than or equal to 0. The terminal device send second data to the network device when the terminal device does not receive the response message corresponding to the first data before the $(n+k)^{th}$ time unit, wherein the second data is new data which is different from the first data, where k is a positive integer. According to the data transmission method provided in some embodiments of this application, the terminal device may flexibly determine the transmission mode of the second data based on an actual situation, so as to reduce a transmission delay of uplink data and improve transmission reliability of the uplink data.

9 Claims, 4 Drawing Sheets

200

A terminal device sends first data to a network device in the $n^{th}$ time unit, where n is an integer greater than or equal to 0 — S210

The terminal device determines a transmission mode of second data based on whether the terminal device receives a response message of the first data before the $(n+k)^{th}$ time unit, where k is a positive integer — S220

(56) References Cited

FOREIGN PATENT DOCUMENTS

| CN | 102088775 A | 6/2011 |
|----|-------------|--------|
| CN | 102158972 A | 8/2011 |
| WO | 2016153548 A1 | 9/2016 |
| WO | 2017016425 A1 | 2/2017 |

OTHER PUBLICATIONS

"Scheduling for URLLC," 3GPP TSG-RAN WG2 Meeting #96, Reno, Nevada, US, R2-168459, Total 5 pages, 3rd Generation Partnership Project, Valbonne, France (Nov. 14-18, 2016).

"HARQ timing relationships for grant-free transmission," 3GPP TSG-RAN WG1 Meeting #86, Gothenburg, Sweden, R1-167206, XP051140574, pp. 1-2, 3rd Generation Partnership Project, Valbonne, France (Aug. 22-26, 2016).

"URLLC HARQ operation," 3GPP TSG-RAN WG1 AH NR Meeting, Spokane, USA, R1-1700205, XP051207744, pp. 1-4, 3rd Generation Partnership Project, Valbonne, France (Jan. 16-20, 2017).

"Basic Grant-free Transmission for URLLC", 3GPP TSG-RAN WG1 AH NR Meeting, Spokane, USA, R1-1700253, XP051207791, pp. 1-6, 3rd Generation Partnership Project, Valbonne, France (Jan. 16-20, 2017).

"Scheduling for URLLC," 3GPP TSG-RAN WG1 Meeting #96, Reno, Nevada, R2-168459, XP051178049, pp. 1-6, 3rd Generation Partnership Project, Valbonne, France (Nov. 14-18, 2016).

"RRC 'new state' in NR," 3GPP TSG-RAN WG2 Meeting #96, Reno, Nevada, R2-168777, pp. 1-3, 3rd Generation Partnership Project, Valbonne, France (Nov. 14-18, 2016).

\* cited by examiner

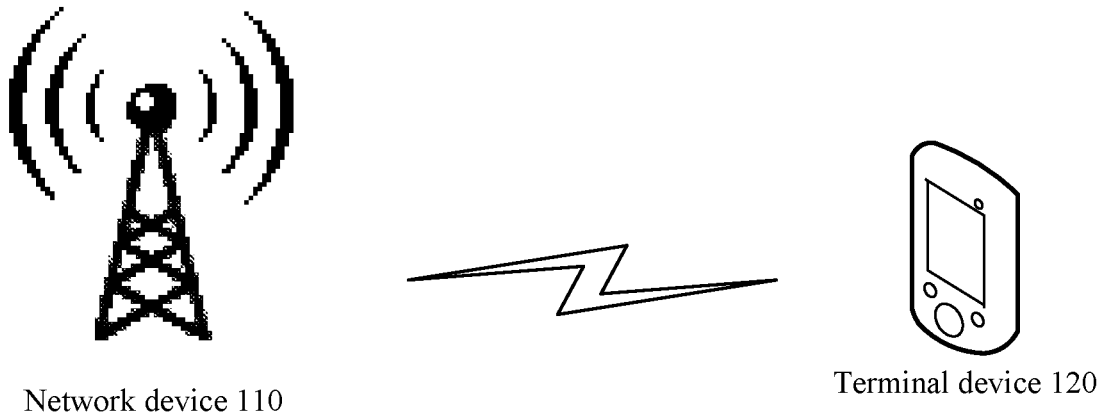

Network device 110    Terminal device 120

A terminal device sends first data to a network device in the $n^{th}$ time unit, where n is an integer greater than or equal to 0 — S210

The terminal device determines a transmission mode of second data based on whether the terminal device receives a response message of the first data before the $(n+k)^{th}$ time unit, where k is a positive integer — S220

FIG. 2

DATA TRANSMISSION METHOD AND APPARATUS

CROSS-REFERENCE TO RELATED APPLICATIONS

This application is a continuation of International Application No. PCT/CN2018/075223, filed on Feb. 5, 2018, which claims priority to Chinese Patent Application No. 201710065963.3, filed on Feb. 6, 2017. The disclosures of the aforementioned applications are hereby incorporated by reference in their entireties.

TECHNICAL FIELD

Embodiments of this application relate to the communications field, and in particular, to a data transmission method and apparatus in a wireless communications system.

BACKGROUND

In the prior art, after sending data to a network device in a grant-free transmission mode, a terminal device sends data to the network device again in the grant-free transmission mode. Alternatively, after sending data to a network device in a grant-based transmission mode, a terminal device sends data again by using a resource scheduled by using scheduling information of the network device.

With the development of communications technologies, new services are continuously emerging, and some new services impose a very stringent requirement on transmission reliability and a transmission delay of uplink data. For example, some new services require that uplink data has a very low latency and relatively high reliability. However, the requirement of these new services cannot be met in the prior art.

Therefore, a technology needs to be provided for reducing a transmission delay of uplink data and improve reliability of the uplink data.

SUMMARY

A data transmission method and apparatus provided in this application can reduce a transmission delay of uplink data and improve reliability of the uplink data.

According to a first aspect, a data transmission method is provided, and the method includes: sending, by a terminal device, first data to a network device in the $n^{th}$ time unit, where n is an integer greater than or equal to 0; and determining, by the terminal device, a transmission mode of second data based on whether the terminal device receives a response message of the first data before the $(n+k)^{th}$ time unit, where k is a positive integer.

According to the data transmission method provided in an embodiment of this application, the terminal device may flexibly determine the transmission mode of the second data based on an actual situation, to reduce a transmission delay of uplink data and improve transmission reliability of the uplink data.

Optionally, the determining, by the terminal device, a transmission mode of second data based on whether the terminal device receives a response message of the first data before the $(n+k)^{th}$ time unit includes: when the terminal device receives the response message before the $(n+k)^{th}$ time unit, determining, by the terminal device, the transmission mode of the second data based on the response message.

Optionally, the determining, by the terminal device, the transmission mode of the second data based on the response message includes: when the response message includes scheduling information, determining, by the terminal device, that the transmission mode of the second data is a grant-based transmission mode; or when the response message does not include scheduling information, determining, by the terminal device, that the transmission mode of the second data is a grant-free transmission mode.

Optionally, the determining, by the terminal device, a transmission mode of second data based on whether the terminal device receives a response message of the first data before the $(n+k)^{th}$ time unit includes: when the terminal device does not receive the response message before the $(n+k)^{th}$ time unit, determining, by the terminal device, that the transmission mode of the second data is a grant-free transmission mode.

Therefore, a case in which a transmission delay of the second data is increased due to waiting for the response message for a long time can be avoided.

Optionally, the method further includes: receiving, by the terminal device, first indication information, where the first indication information is used to determine k.

According to the data transmission method provided in this embodiment of this application, a value of k may be flexibly determined based on the first indication information. In this case, duration for waiting for the response message by the terminal device may be flexibly determined based on an actual situation.

Optionally, a transmission mode in which the terminal device sends the first data to the network device in the $n^{th}$ time unit is a grant-free transmission mode.

According to a second aspect, a data transmission method is provided, and the method includes: receiving, by a network device, first data from a terminal device in the $m^{th}$ time unit, where the first data is data sent by the terminal device in a grant-free transmission mode, and m is an integer greater than or equal to 0; and sending, by the network device, a response message of the first data to the terminal device before the $(m+p)^{th}$ time unit, where the response message includes scheduling information, and p is a positive integer.

According to the data transmission method provided in an embodiment of this application, the network device may flexibly determine, based on an actual situation, a transmission mode in which the terminal device sends data again, to reduce a transmission delay of uplink data and improve transmission reliability of the uplink data.

Optionally, before the sending, by the network device, the response message to the terminal device, the method further includes: sending, by the network device, first indication information to the terminal device, where the first indication information is used by the terminal device to determine a time for waiting for the response message.

According to the data transmission method provided in this embodiment of this application, the network device may flexibly determine, based on an actual situation, the time for waiting for the response message by the terminal device.

According to a third aspect, an embodiment of this application provides a wireless communications apparatus. The apparatus can implement a function performed by the terminal device in the method in the first aspect, and the function may be implemented by hardware, or may be implemented by hardware by executing corresponding software. The hardware or software includes one or more units or modules corresponding to the foregoing function.

In a possible design, a structure of the apparatus includes a processor and a transceiver. The processor is configured to support the apparatus in performing a corresponding function in the foregoing method. The transceiver is configured to support communication between the apparatus and another network element. The apparatus may further include a memory. The memory is configured to be coupled to the processor, and the memory stores a program instruction and data that are necessary for the apparatus.

According to a fourth aspect, an embodiment of this application provides a wireless communications apparatus. The apparatus can implement a function performed by the network device in the method in the second aspect, and the function may be implemented by hardware, or may be implemented by hardware by executing corresponding software. The hardware or software includes one or more units or modules corresponding to the foregoing function.

In a possible design, a structure of the apparatus includes a processor and a transceiver. The processor is configured to support the apparatus in performing a corresponding function in the foregoing method. The transceiver is configured to support communication between the apparatus and another network element. The apparatus may further include a memory. The memory is configured to be coupled to the processor, and the memory stores a program instruction and data that are necessary for the apparatus.

According to a fifth aspect, a computer program product is provided. The computer program product includes computer program code, and when the computer program code is run by a communications unit and a processing unit, or a transceiver and a processor in a terminal device, the terminal device performs the method in the first aspect.

According to a sixth aspect, a computer program product is provided. The computer program product includes computer program code, and when the computer program code is run by a communications unit and a processing unit, or a transceiver and a processor in a network device, the network device performs the method in the second aspect.

According to a seventh aspect, an embodiment of this application provides a computer storage medium, configured to store a computer software instruction used by the foregoing terminal device. The computer storage medium includes a program designed for performing the method in the first aspect.

According to an eighth aspect, an embodiment of this application provides a computer storage medium, configured to store a computer software instruction used by the foregoing network device. The computer storage medium includes a program designed for performing the method in the second aspect.

DESCRIPTION OF DRAWINGS

FIG. 1 is a schematic architectural diagram of a communications system applicable to an embodiment of this application;

FIG. 2 is a schematic flowchart of a data transmission method according to an embodiment of this application;

DESCRIPTION OF EMBODIMENTS

Figure 3:
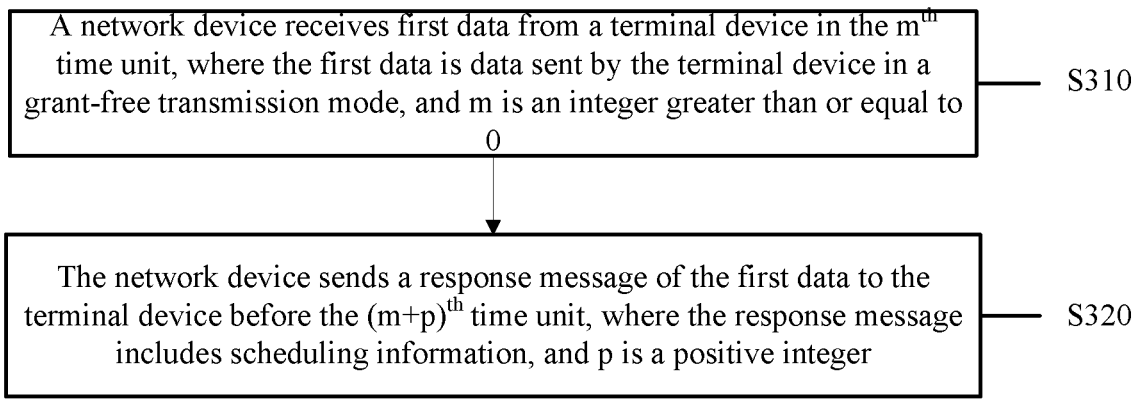
FIG. 3 is a schematic flowchart of another data transmission method according to an embodiment of this application.

The following describes technical solutions of this application with reference to accompanying drawings.

FIG. 1 shows a communications system 100 applicable to an embodiment of this application. The communications system 100 includes a network device 110 and a terminal device 120. The network device 110 and the terminal device 120 communicate with each other through a wireless network. When the terminal device 120 sends data, a wireless communications module may encode information for transmission. Specifically, the wireless communications module may obtain a specific quantity of data bits to be sent to the network device 110 through a channel. These data bits are, for example, data bits generated by a processing module, received from another device, or stored in a storage module. These data bits may be included in one or more transport blocks (which may also be referred to as an information block), and the transport block may be segmented to generate a plurality of code blocks.

In this application, the terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a handheld device having a wireless communication function, a computing device, another processing device connected to a wireless modem, an in-vehicle device, a wearable device, and user equipment in a 5th generation (5G) system.

The network device may be a base transceiver station (BTS) in a code division multiple access (CDMA) system, a NodeB (NB) in a wideband code division multiple access (WCDMA) system, an evolved NodeB (eNB) in a long term evolution (LTE) system, or a gNB in a 5G system. The foregoing base stations are only used as examples for description. Alternatively, the network device may be a relay node, an access point, an in-vehicle device, a wearable device, or another type of device.

In addition, in this embodiment of the present invention, the network device provides a service for the terminal device by using a cell, and the terminal device communicates with the network device by using a resource (for example, a time-frequency resource) of the cell. The cell may be a cell managed by the network device (for example, a base station). The cell may be a macro base station cell, or may be a small cell. The small cell herein may include a metro cell, a micro cell, a pico cell, a femto cell, and the like. These small cells are characterized by small coverage and a low transmit power, and are applicable to high-rate data transmission services.

In addition, in an LTE system or a 5G system, a plurality of cells may simultaneously work at a same frequency. In some special scenarios, it may also be considered that a concept of a carrier is equivalent to a concept of a cell. For example, in a carrier aggregation (CA) scenario, when a secondary component carrier is configured for a terminal device, a configuration carries both a carrier index of the secondary component carrier and a cell identifier of a secondary serving cell working on the secondary component carrier. In this case, it may be considered that the concept of the carrier is equivalent to the concept of the cell. For example, that the terminal device accesses a carrier is equivalent to that the terminal device accesses a cell.

The foregoing communications system applicable to this embodiment of this application is only used as an example for description, and a communications system applicable to this embodiment of this application is not limited thereto. For example, the communications system may include another quantity of network devices and another quantity of terminal devices.

For ease of understanding of this application, the following describes in detail concepts that may be used in this application.

Grant-free transmission may be understood as any one or more of the following meanings, or a combination of some technical features in a plurality of meanings, or another similar meaning.

Grant-free transmission may mean: A network device pre-allocates a plurality of transmission resources to a terminal device and notifies the terminal device of the plurality of transmission resources; when the terminal device needs to transmit uplink data, the terminal device selects at least one transmission resource from the plurality of transmission resources pre-allocated by the network device, and sends the uplink data by using the selected transmission resource; and the network device detects, on one or more of the plurality of pre-allocated transmission resources, the uplink data sent by the terminal device. The detection may be blind detection, detection performed based on a control field in the uplink data, or detection performed in another manner.

Grant-free transmission may mean: A network device pre-allocates a plurality of transmission resources to a terminal device and notifies the terminal device of the plurality of transmission resources, so that when the terminal device needs to transmit uplink data, the terminal device selects at least one transmission resource from the plurality of transmission resources pre-allocated by the network device, and sends the uplink data by using the selected transmission resource.

Grant-free transmission may mean: Information about a plurality of pre-allocated transmission resources is obtained; when uplink data needs to be transmitted, at least one transmission resource is selected from the plurality of transmission resources, and the uplink data is sent by using the selected transmission resource. The information about the plurality of pre-allocated transmission resources may be obtained from a network device.

Grant-free transmission may mean: Uplink data transmission of a terminal device can be implemented without dynamic scheduling performed by a network device. The dynamic scheduling may be a scheduling manner in which the network device indicates, by using signaling, a transmission resource for each time of uplink data transmission of the terminal device. Optionally, implementing uplink data transmission of the terminal device can be understood as follows: Two or more terminal devices are allowed to transmit uplink data on a same time-frequency resource. Optionally, the transmission resource may be a transmission resource in one or more transmission time units following a moment at which the terminal device receives the signaling. One transmission time unit may be a smallest time unit for one time of transmission, for example, a transmission time interval (TTI).

Grant-free transmission may mean: A terminal device transmits uplink data without a grant from a network device. The grant may mean: The terminal device sends an uplink scheduling request to the network device; after receiving the scheduling request, the network device sends an uplink grant to the terminal device, where the uplink grant indicates an uplink transmission resource allocated to the terminal device.

Grant-free transmission may mean a contention-based transmission mode and may specifically mean: A plurality of terminals simultaneously transmit uplink data on a same pre-allocated time-frequency resource without scheduling performed by a base station.

The data may be service data or signaling data.

The blind detection may be understood as detection performed on possibly arriving data without foreknowing whether data is to arrive. The blind detection may also be understood as detection performed without an explicit signaling indication.

In this embodiment of this application, a basic time unit of grant-free transmission may be a TTI (for example, including a short transmission time interval (sTTI)). After an sTTI technology is introduced, grant-free transmission may include downlink data channel receiving or uplink data channel sending within a TTI length of one millisecond (ms) or less than 1 ms.

In this embodiment of this application, a time-frequency resource used by the network device and the terminal device to transmit information may be a time-frequency resource used based on a contention mechanism, or may be a time-frequency resource used based on a non-contention mechanism. For the time-frequency resource used based on the contention mechanism, the terminal device may detect whether the time-frequency resource is currently in an idle mode, or in other words, whether the time-frequency resource is used by another device. If the time-frequency resource is in the idle mode, or in other words, the time-frequency resource is not used by another device, the terminal device may use the time-frequency resource for communication, for example, uplink transmission. If the time-frequency resource is not in the idle mode, or in other words, the time-frequency resource is used by another device, the terminal device cannot use the time-frequency resource. It should be noted that, in this embodiment of this application, a specific method and process based on the foregoing contention mechanism may be similar to that in the prior art. Herein, to avoid repeated description, details thereof are omitted.

In this embodiment of this application, a time-frequency resource used by the communications system 100 (or in other words, a time-frequency resource used by the network device and the terminal device based on the contention mechanism) may be a granted time-frequency resource, or may be a grant-free time-frequency resource. This is not limited in this embodiment of this application. In this embodiment of this application, each communications device (for example, the network device or the terminal device) in the communications system 100 may use, based on a grant-free transmission mode, a time-frequency resource for communication, or may use, based on a grant-based manner, a time-frequency resource for communication. This is not limited in this embodiment of this application.

In this application, a resource used by the network device and the terminal device to transmit information may be divided into a plurality of time units, and the plurality of time units may be consecutive, or a preset interval may be set between some adjacent time units. This is not limited in this application.

In this application, a length of a time unit may be set arbitrarily. This is not limited in this application.

For example, one time unit may include one or more subframes.

Alternatively, one time unit may include one or more slots or mini-slots.

Alternatively, one time unit may include one or more time domain symbols.

Alternatively, one time unit may include one or more TTIs or sTTIs.

Alternatively, a length of one time unit is 1 ms.

Alternatively, a length of one time unit is less than 1 ms.

A TTI is a time parameter commonly used in an existing communications system, and is a time unit for scheduling data in the communications system. In an LTE system, a time length of one TTI is 1 ms, and is corresponding to a time length of one subframe, that is, a time length of two slots.

In this embodiment of this application, data transmission may be scheduled based on the network device, and a basic time unit for scheduling is one or more minimum time scheduling units. The minimum time scheduling unit may be the foregoing TTI or the foregoing sTTI. A specific scheduling procedure is that a base station sends a control channel, for example, a physical downlink control channel (PDCCH), an enhanced physical downlink control channel (EPDCCH), or a physical downlink control channel for scheduling sTTI transmission (sPDCCH). The control channel may carry scheduling information, in different downlink control information (DCI) formats, used for scheduling a physical downlink shared channel (PDSCH) or a physical uplink shared channel (PUSCH). The scheduling information includes control information such as resource allocation information and a modulation and coding scheme. The terminal device detects the control channel, and performs downlink data channel receiving or uplink data channel sending based on detected scheduling information carried in the control channel.

The foregoing describes in detail concepts that may be used in this application, and with reference to the accompanying diagrams, the following describes in detail a data transmission method and apparatus that are provided in embodiments of this application.

FIG. 2 is a schematic flowchart of a data transmission method 200 according to this application. The method 200 includes the following steps:

S210. A terminal device sends first data to a network device in the $n^{th}$ time unit, where n is an integer greater than or equal to 0.

S220. The terminal device determines a transmission mode of second data based on whether the terminal device receives a response message of the first data before the $(n+k)^{th}$ time unit, where k is a positive integer.

In S210, the terminal device may send the first data in a grant-based transmission mode, or may send the first data in a grant-free transmission mode, or send the first data in another transmission mode. This is not limited in this application.

The first data is any data sent by the terminal device, and may be initially transmitted data, or may be retransmitted data.

In S220, the terminal device may start timing immediately after completing sending of the first data, or may start timing a period of time later after completing sending of the first data. For example, if the terminal device completes sending of the first data in the first time unit, and determines to detect the response message of the first data before the tenth time unit, the terminal device may start timing from the second time unit, or may start timing from the fifth time unit.

After starting timing, the terminal device may receive the response message of the first data through blind detection, or may receive the response message of the first data in common search space or dedicated search space. When the terminal device receives the response message before the $(n+k)^{th}$ time unit, the terminal device determines to send the second data in a first transmission mode, and the first transmission mode may be, for example, a grant-based transmission mode. When the terminal device does not receive the response message before the $(n+k)^{th}$ time unit, the terminal device determines to send the second data in a second transmission mode, and the second transmission mode may be, for example, a grant-free transmission mode. The first transmission mode and the second transmission mode may be different or may be the same, and specific content of the first transmission mode and the second transmission mode is not limited in this application. Which transmission mode to be specifically used may be determined by the terminal device according to a predefined rule or may be determined based on indication information of the network device.

In addition, the second data is any data sent by the terminal device, and may be initially transmitted data, or may be retransmitted data. The second data and the first data may be exactly the same, partially the same, or totally different.

In this application, after determining the transmission mode of the second data, the terminal device sends the second data in the transmission mode when the terminal device needs to send the second data. It should be understood that, that the terminal device determines the transmission mode of the second data means: The terminal device determines a transmission mode in which the terminal device sends data next time, and the terminal device does not necessarily send the second data. For example, when the second data is retransmitted data, the terminal device sends the second data in the determined transmission mode of the second data; when the second data is not retransmitted data and the terminal device needs to transmit new data, the terminal device sends the second data in the foregoing transmission mode of the second data; and when the terminal device has not obtained the second data (for example, the second data has not been received or the second data has not been generated), if the terminal device has never received scheduling information of the network device before obtaining the second data, the terminal device may wait to obtain the second data, and then send the second data in the foregoing transmission mode of the second data, or if the terminal device receives scheduling information of the network device before obtaining the second data, the terminal device sends the second data based on the scheduling information.

In this application, k is a positive integer, and may be set by the network device based on a service scenario of the terminal device. For example, when a scenario in which the terminal device is located is a scenario in which there is a relatively high requirement for a data transmission delay, k may be set to a relatively small value, so that when the terminal device still has not received the response message of the first data after waiting for a relatively short period of time, the terminal device can send the second data in a preset transmission mode; and when a scenario in which the terminal device is located is a scenario in which there is a relatively high requirement for data transmission reliability, k may be set to a relatively large value, so that the terminal device may wait for a relatively long period of time to ensure that the terminal device can send the second data in a reliable transmission mode. In addition, k may be a value determined according to a specification of a protocol or may be determined by the terminal device based on indication information.

For example, in an ultra-reliable and low latency communications (URLLC) scenario, it is generally required that a transmission delay of a wireless air interface falls within 1 ms and transmission reliability reaches 99.999%. A very stringent requirement is imposed on a data latency, and k may be set to a relatively small value. After receiving the first data, the network device determines, based on the value of k, a time unit in which the network device sends the response message of the first data to the terminal device, and specifies, in the response message, a transmission mode with higher reliability for sending the second data by the terminal device, so that a requirement of the URLLC scenario for a latency and reliability of uplink data can be met.

In conclusion, according to the data transmission method provided in this embodiment of this application, after sending the first data in the $n^{th}$ time unit, the terminal device determines the transmission mode of the second data based on whether the terminal device receives the response message of the first data before the $(n+k)^{th}$ time unit, so that the terminal device may flexibly determine the transmission mode of the second data based on an actual situation, to reduce a transmission delay of uplink data and improve transmission reliability of the uplink data.

Optionally, that the terminal device determines a transmission mode of second data based on whether the terminal device receives a response message of the first data before the $(n+k)^{th}$ time unit includes the following step:

S221. When the terminal device receives the response message before the $(n+k)^{th}$ time unit, the terminal device determines the transmission mode of the second data based on the response message.

In S221, the terminal device may determine the transmission mode of the second data based on information included in the response message, or may determine the transmission mode of the second data based on a correspondence between a response message and a transmission mode. For example, the terminal device may determine the transmission mode of the second data based on a type of the response message. Any method for determining the transmission mode of the second data based on the response message falls within the protection scope of this application.

According to the data transmission method provided in this embodiment of this application, when the terminal device receives the response message before the $(n+k)^{th}$ time unit, the terminal device determines the transmission mode of the second data based on the response message, so that the terminal device may flexibly determine the transmission mode of the second data based on an actual situation, to reduce a transmission delay of uplink data and improve transmission reliability of the uplink data.

Optionally, that the terminal device determines the transmission mode of the second data based on the response message includes the following steps:

S222. When the response message includes scheduling information, the terminal device determines that the transmission mode of the second data is a grant-based transmission mode.

S223. When the response message does not include scheduling information, the terminal device determines that the transmission mode of the second data is a grant-free transmission mode.

In an optional embodiment, when the response message received by the terminal device includes the scheduling information, the terminal device may send the second data by using a resource allocated based on the scheduling information, that is, transmit the second data in the grant-based transmission mode, to improve transmission reliability of the uplink data. In another optional embodiment, when the response message received by the terminal device does not include the scheduling information, the terminal device may determine, from a grant-free resource pool, a resource for transmitting the second data and send the second data, that is, transmit the second data in the grant-free transmission mode, to reduce a waiting delay of uplink data transmission.

In S222, the scheduling information may be retransmission scheduling information, or may be new-transmission scheduling information. When the scheduling information is retransmission scheduling information, the second data is retransmitted data of the first data, and the second data and the first data may be exactly the same, partially the same, or totally different. When the scheduling information is new-transmission scheduling information, the second data and the first data are data generated after the terminal device codes different information blocks.

In S222, the response message may further include an acknowledgement (ACK) and a negative acknowledgement (NACK). The ACK is used to indicate that the network device successfully receives the first data, and the NACK is used to indicate that the network device does not successfully receive the first data.

In S223, the response message may include trigger information of the grant-free transmission mode, and the terminal device determines, based on the trigger information, that the transmission mode of the second data is a grant-free transmission mode. Alternatively, the response message may not include trigger information of the grant-free transmission mode, and the terminal device determines, according to a predefined rule, that the transmission mode of the second data is a grant-free transmission mode.

In S223, the response message may further include an ACK and a NACK. The ACK is used to indicate that the network device successfully receives the first data, and the terminal device may determine, based on the ACK, that an information block corresponding to the first data is no longer retransmitted. When the terminal device needs to transmit other data, the terminal device may send to-be-sent data in the grant-free transmission mode; and when the terminal device does not need to transmit data, the terminal device may not send data. If the terminal device has never received scheduling information of the network device after receiving the response message, after obtaining new data, the terminal device sends the new data in the grant-free transmission mode; or if the terminal device receives scheduling information of the network device after receiving the response message, after obtaining new data, the terminal device sends the new data based on the scheduling information. The NACK is used to indicate that the network device does not successfully receive the first data, the terminal device may determine, based on the NACK, to use the grant-free transmission mode to retransmit an information block corresponding to the first data (that is, send the second data).

Optionally, that the terminal device determines a transmission mode of second data based on whether the terminal device receives a response message of the first data before the $(n+k)^{th}$ time unit includes the following step:

S224. When the terminal device does not receive the response message before the $(n+k)^{th}$ time unit, the terminal device determines that the transmission mode of the second data is a grant-free transmission mode.

In S224, a reason why the terminal device does not receive the response message may be that the network device does not receive the first data or that the network device fails to send the response message of the first data in a timely manner. In this case, the terminal device may retransmit an information block corresponding to the first data (that is, the second data is retransmitted data), or may no longer retransmit the information block corresponding to the first data (that is, the second data is newly transmitted data). In addition, to avoid a case in which a transmission delay of the second data is increased due to waiting for the response message for a long time, the terminal device may send the second data in the grant-free transmission mode.

Optionally, the method 200 further includes the following step:

S230. The terminal device receives first indication information, where the first indication information is used to determine k.

In S230, the terminal device may determine a value of k based on the first indication information received from the network device. The first indication information may directly indicate the value of k, or may indicate a time parameter. The terminal device determines the value of k based on the time parameter. For example, when the time parameter indicated by the first indication information is five time units, and after completing sending of the first data, the terminal device waits for three time units to start timing, the terminal device may determine, based on the time parameter and the waiting time for timing, that the value of k is 8.

The terminal device may alternatively determine a value of k according to a specification of a protocol. The protocol may directly specify the value of k, or may stipulate a time parameter. The terminal device determines the value of k based on the time parameter. For example, when the protocol specifies that the time parameter is six time units, and after completing sending of the first data, the terminal device waits for three time units to start timing, the terminal device may determine, based on the time parameter and the waiting time for timing, that the value of k is 9.

The foregoing embodiment is only used as an example for description, and this application is not limited thereto. Any method for determining k based on the first indication information falls within the protection scope of this application.

Therefore, according to the data transmission method provided in this embodiment of this application, the value of k may be flexibly determined based on the first indication information. In this case, duration for waiting for the response message by the terminal device may be flexibly determined based on an actual situation.

Optionally, in this application, when the second data is transmitted in the grant-free transmission mode, the second data may be a buffer status report (BSR).

Optionally, when the second data is retransmitted data, the terminal device may send the second data in at least one of the following methods:

sending the second data at a transmit power $P_2$, where $P_2 > P_1$, and $P_1$ is a transmit power at which the terminal device sends the first data; and sending the second data by using a resource X, where the resource X is different from a resource Y that is used by the terminal device to send the first data.

Optionally, the terminal device may alternatively retransmit an information block corresponding to the second data for a plurality of times.

FIG. 3 is a schematic flowchart of a data transmission method 300 according to this application. The method 300 includes the following steps:

S310. A network device receives first data from a terminal device in the $m^{th}$ time unit, where the first data is data sent by the terminal device in a grant-free transmission mode, and m is an integer greater than or equal to 0.

S320. The network device sends a response message of the first data to the terminal device before the $(m+p)^{th}$ time unit, where the response message includes scheduling information, and p is a positive integer.

In S310, after receiving the first data sent by the terminal device, the network device may determine, based on an actual situation, whether to send the response message of the first data to the terminal device. Duration between the $m^{th}$ time unit and the $(m+p)^{th}$ time unit is less than or equal to duration between the $n^{th}$ time unit and the $(n+k)^{th}$ time unit in the method 200.

For example, when the network device determines that the terminal device can receive the response message of the first data within a waiting time period, the network device may send the response message to the terminal device, and the terminal device determines a transmission mode of second data based on the response message after receiving the response message within the waiting time period. The waiting time period may be, for example, a time period between the $n^{th}$ time unit to the $(n+k)^{th}$ time unit in the method 200.

For another example, when the network device determines that the terminal device can send the second data in a reliable transmission mode, the network device may not send the response message to the terminal device, and the terminal device can send the second data in the foregoing reliable transmission mode when the terminal device does not receive the response message within a waiting time period.

Optionally, the response message includes scheduling information.

Optionally, the response message includes trigger information of grant-free transmission.

For example, when the first data is received correctly, the terminal device still has data to be transmitted, and there is a resource that may be scheduled, the response message may include new-transmission scheduling information and an ACK.

For another example, when the first data is received correctly, the terminal device still has data to be transmitted, and there is no resource that may be scheduled, the response message may include trigger information of grant-free transmission and an ACK.

For still another example, when the first data is received correctly, and the terminal device has no data to be transmitted, the response message may include an ACK.

For still another example, when the first data is received incorrectly, and there is a resource that may be scheduled, the response message may include retransmission scheduling information and a NACK.

For still another example, when the first data is received incorrectly, and there is no resource that may be scheduled, the response message may include a NACK, or the response message is not sent.

For still another example, when the network device does not receive the first data, the network device does not send the response message.

In the foregoing examples, the terminal device may perform corresponding processing according to the method 200, and details are not repeated herein.

In conclusion, according to the data transmission method 300 provided in this embodiment of this application, after receiving the first data in the $m^{th}$ time unit, the network device sends, before the $(m+p)^{th}$ time unit, the response message including the scheduling information to the terminal device. In this case, the terminal device may flexibly determine the transmission mode of the second data based on an actual situation, to reduce a transmission delay of uplink data and improve transmission reliability of the uplink data.

Optionally, before the network device sends the response message to the terminal device, the method 300 further includes the following step:

S330. The network device sends first indication information to the terminal device, where the first indication information is used by the terminal device to determine a time for waiting for the response message.

Therefore, the terminal device may flexibly determine, based on the first indication information, the time for waiting for the response message of the first data.

The foregoing describes in detail examples of the data transmission method provided in this application. It can be understood that, to implement the foregoing functions, both the terminal device and the network device include a corresponding hardware structure and/or software module for performing each function. A person skilled in the art should easily be aware that, in combination with the examples described in the embodiments disclosed in this specification, units and algorithms steps can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, functional unit division may be performed on the terminal device or the like according to the examples of the foregoing method. For example, functional units may be obtained through division based on corresponding functions, or two or more functions may be integrated into one processing unit. The integrated unit may be implemented in a form of hardware, or may be implemented in a form of a software functional unit. It should be noted that, in the embodiments of this application, unit division is an example, and is merely logical function division, and may be another division in actual implementation.

Figure 4:
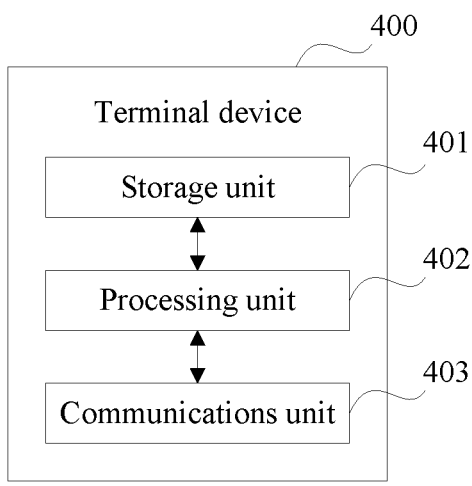
FIG. 4 is a possible schematic structural diagram of a terminal device according to an embodiment of this application.

When an integrated unit is used, FIG. 4 is a possible schematic structural diagram of the terminal device in the foregoing embodiments. The terminal device 400 includes a processing unit 402 and a communications unit 403. The processing unit 402 is configured to perform control management on an action of the terminal device 400. For example, the processing unit 402 is configured to support the terminal device 400 in performing S220 in FIG. 2 and/or configured to perform another process of the technology described in this specification. The communications unit 403 is configured to support communication between the terminal device 400 and another network entity, for example, communication between the terminal device 400 and a network device. The terminal device 400 may further include a storage unit 401, configured to store program code and data of the terminal device 400.

The processing unit 402 may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or a combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications unit 403 may be a transceiver, a transceiver circuit, or the like. The storage unit 401 may be a memory.

Figure 5:
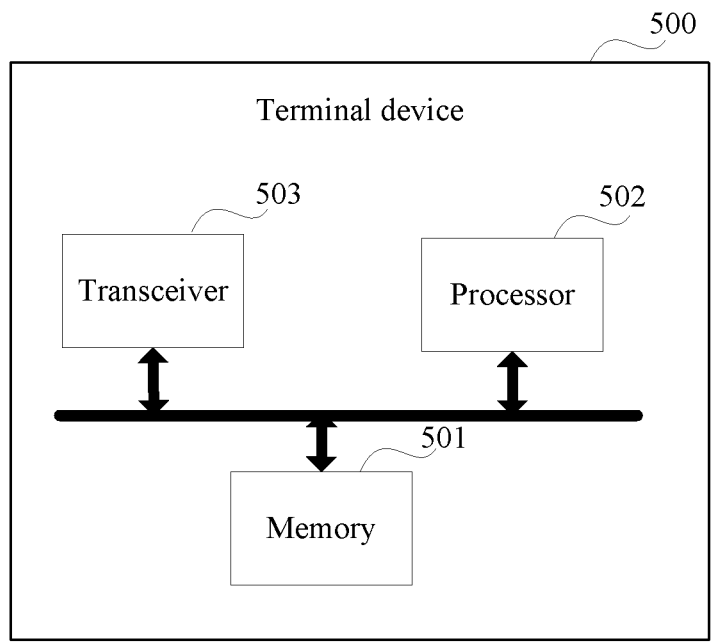
FIG. 5 is another possible schematic structural diagram of a terminal device according to an embodiment of this application.

When the processing unit 402 is a processor, the communications unit 403 is a transceiver, and the storage unit 401 is a memory, the terminal device in this embodiment of this application may be a terminal device shown in FIG. 5.

Referring to FIG. 5, the terminal device 500 includes a processor 502, a transceiver 503, and a memory 501. The transceiver 503, the processor 502, and the memory 501 may communicate with each other through an internal connection path to transfer a control and/or data signal.

It may be clearly understood by a person skilled in the art that, for the purpose of convenient and brief description, for a detailed working process of the foregoing apparatus and unit, refer to a corresponding process in the foregoing method embodiments. Details are not described herein again.

Therefore, after sending first data in the $n^{th}$ time unit, the terminal device 400 and the terminal device 500 provided in this embodiment of this application determine a transmission mode of second data based on whether the terminal device 400 and the terminal device 500 receive a response message of the first data before the $(n+k)^{th}$ time unit. In this case, the terminal device 400 and the terminal device 500 may flexibly determine the transmission mode of the second data based on an actual situation, to reduce a transmission delay of uplink data and improve transmission reliability of the uplink data.

Figure 6:
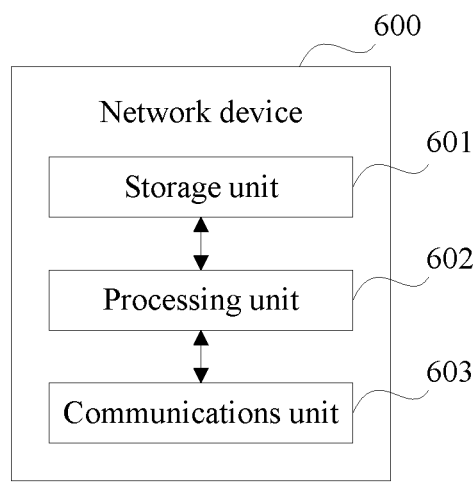
FIG. 6 is a possible schematic structural diagram of a network device according to an embodiment of this application.

When an integrated unit is used, FIG. 6 is a possible schematic structural diagram of the network device in the foregoing embodiments. The network device 600 includes a processing unit 602 and a communications unit 603. The processing unit 602 is configured to perform control management on an action of the network device 600. For example, the processing unit 602 is configured to support the network device 600 in performing S320 in FIG. 3 and/or configured to perform another process of the technology described in this specification. The communications unit 603 is configured to support communication between the network device 600 and another network entity, for example, communication between the network device 600 and a terminal device. The network device 600 may further include a storage unit 601, configured to store program code and data of the network device 600.

The processing unit 602 may be a processor or a controller, for example, may be a CPU, a general purpose processor, a DSP, an ASIC, an FPGA or another programmable logic device, a transistor logic device, a hardware component, or any combination thereof. The controller/processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications unit 603 may be a transceiver, a transceiver circuit, or the like. The storage unit 601 may be a memory.

Figure 7:
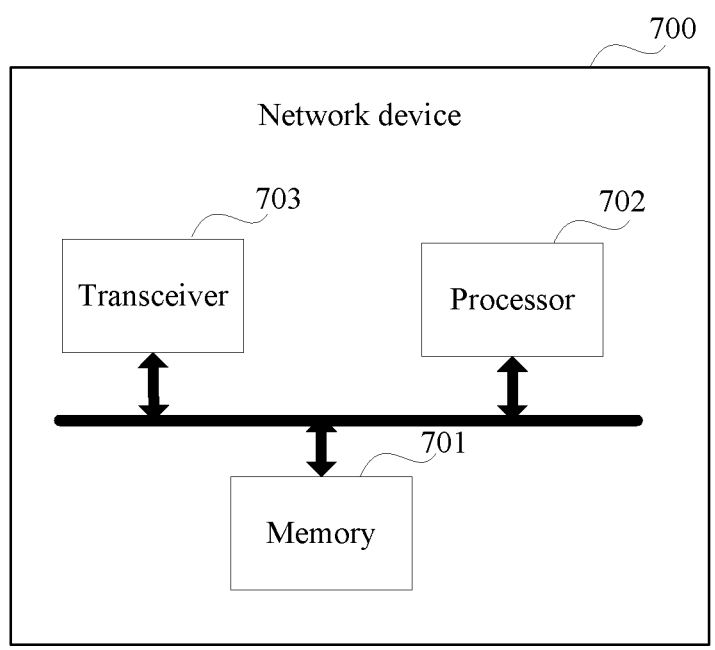
FIG. 7 is another possible schematic structural diagram of a network device according to an embodiment of this application.

When the processing unit 602 is a processor, the communications unit 603 is a transceiver, and the storage unit 601 is a memory, the network device provided in this embodiment of this application may be a network device shown in FIG. 7.

Referring to FIG. 7, the network device 700 includes a processor 702, a transceiver 703, and a memory 701. The transceiver 703, the processor 702, and the memory 701 may communicate with each other through an internal connection path to transfer a control and/or data signal.

It may be clearly understood by a person skilled in the art that, for ease and brevity of description, for a detailed working process of the foregoing apparatus and unit, refer to a corresponding process in the foregoing method embodiments. Details are not described herein again.

Therefore, after receiving first data in the $m^{th}$ time unit, the network device 600 and the network device 700 provided in this embodiment of this application send, before the $(m+p)^{th}$ time unit, a response message including scheduling information to the terminal device. In this case, the network device 600 and the network device 700 may flexibly determine a transmission mode of second data based on an actual situation, to reduce a transmission delay of uplink data and improve transmission reliability of the uplink data.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Methods or algorithm steps described in combination with the content disclosed in the embodiments of this application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a terminal device. Certainly, the processor and the storage medium may exist in a terminal device and a network device as discrete components.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instruction may be stored in a computer readable storage medium, or may be transmitted by using the computer readable storage medium. The computer instruction may be transmitted from one website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, solid state disk (SSD)), or the like.

The objectives, technical solutions, and benefits of this application are further described in detail in the foregoing specific embodiments. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A data transmission method comprising:
   receiving, by a terminal device, first indication information for determining a value of k, wherein k is a positive integer, and wherein the first indication information is used by the terminal device to determine a time for waiting for a response message;
   sending, by the terminal device, first data to a network device in an $n^{th}$ time unit, wherein n is an integer greater than or equal to 0; and
   sending, by the terminal device, second data to the network device when the terminal device does not receive the response message associated with the first data before an $(n+k)^{th}$ time unit,
   wherein in response to the terminal device not receiving the response message before the $(n+k)^{th}$ time unit, the second data is newly transmitted data which is different from the first data.

2. The method according to claim 1, wherein a transmission mode of the second data is a grant-free transmission mode.

3. The method according to claim 1, wherein a transmission mode in which the terminal device sends the first data to the network device in the $n^{th}$ time unit is a grant-free transmission mode.

4. An apparatus in a wireless communication system, the apparatus comprising:
   a processor; and a non-transitory computer readable medium coupled to the processor for storing processor-executable program instructions, wherein the processor-executable program instructions, when executed by the processor, cause the apparatus to:

receive first indication information for determining a value of k, wherein k is a positive integer, and wherein the first indication information is used by the terminal device to determine a time for waiting for a response message;

send first data to a network device in an $n^{th}$ time unit, wherein n is an integer greater than or equal to 0; and send second data to the network device when the terminal device does not receive the response message associated with the first data before an $(n+k)^{th}$ time unit, wherein in response to the terminal device not receiving the response message before the $(n+k)^{th}$ time unit, the second data is newly transmitted data which is different from the first data.

5. The apparatus according to claim 4, wherein a transmission mode of the second data is a grant-free transmission mode.

6. The apparatus according to claim 4, wherein a transmission mode in which the apparatus sends the first data to the network device in the $n^{th}$ time unit is a grant-free transmission mode.

7. An apparatus in a wireless communication system, the apparatus comprising:

a processor; and a non-transitory computer readable medium coupled to the processor for storing processor-executable program instructions, wherein the processor-executable program instructions, when executed by the processor, cause the apparatus to:

send first indication information for determining a value of p, wherein p is a positive integer, and wherein the first indication information is used by the terminal device to determine a time for waiting for a response message;

receive first data from a terminal device in an $m^{th}$ time unit, wherein a transmission mode of the first data is a grant-free transmission mode, and m is an integer greater than or equal to 0; and receive second data from the terminal device when the network device does not send the response message associated with the first data before an $(m+p)^{th}$ time unit, wherein in response to the terminal device not receiving the response message before the $(n+k)^{th}$ time unit, the second data is newly transmitted data which is different from the first data, and p is a positive integer.

8. The apparatus according to claim 7, wherein a transmission mode of the second data is a grant-free transmission mode.

9. The apparatus according to claim 7, the first data from the terminal device in the $m^{th}$ time unit is transmitted via a grant-free transmission mode.

* * * * *